United States Patent [19]

Suzuki et al.

[11] Patent Number: 4,908,752

[45] Date of Patent: Mar. 13, 1990

[54] DC-TO-DC VOLTAGE-INCREASING POWER SOURCE

[75] Inventors: Eiichi Suzuki; Kenji Yokoyama; Masao Noro, all of Hamamatsu, Japan

[73] Assignee: Yamaha Corporation, Shizuoka, Japan

[21] Appl. No.: 328,182

[22] Filed: Mar. 24, 1989

[30] Foreign Application Priority Data

Mar. 25, 1988 [JP] Japan .................................. 63-71170

[51] Int. Cl.$^4$ .......................................... H02M 3/335
[52] U.S. Cl. ...................................... 363/17; 363/61; 363/63; 363/49; 323/908
[58] Field of Search ..................... 363/16–17, 363/59–61, 63, 49; 323/901, 908

[56] References Cited

U.S. PATENT DOCUMENTS

| | | | |
|---|---|---|---|
| 3,986,085 | 10/1976 | Weber | 363/61 |
| 4,092,712 | 5/1978 | Harrigill, Jr. et al. | 363/16 |
| 4,259,600 | 3/1981 | Fellrath et al. | 363/61 |
| 4,298,926 | 11/1981 | Black | 363/17 |

FOREIGN PATENT DOCUMENTS 526991 11/1976 U.S.S.R. .................................. 363/16

Primary Examiner—Peter S. Wong
Attorney, Agent, or Firm—Spensley Horn Jubas & Lubitz

[57] ABSTRACT

A DC-to-DC voltage-increasing power source suitable for use in an audio device mounted on an automobile or a portable type audio device includes a DC power source, a drive pulse generation circuit for generating drive pulses which are in 180 degree phase relationship, a switching circuit of a push-pull connection supplied with operating voltage from the DC power source and driven between an on-state and an off-state in response to the drive pulses, a charge and discharge circuit including capacitors charged by being connected in parallel to the DC power source and discharging a sum voltage by being connected in series to the DC power source and an output takeout circuit for taking out this sum voltage as a voltage-increasing DC output. The switching circuit is constructed of voltage-controlled type elements whose on-state is changed in response to the level of an on-pulse in the drive pulses and the drive pulse generation circuit includes a pulse level changing circuit for changing the level of the on-pulse. in one aspect of the invention, the switching circuit includes a variable time constant circuit for transmitting an on-pulse with a relatively large time constant and an off-pulse with a relatively small time constant.

10 Claims, 9 Drawing Sheets

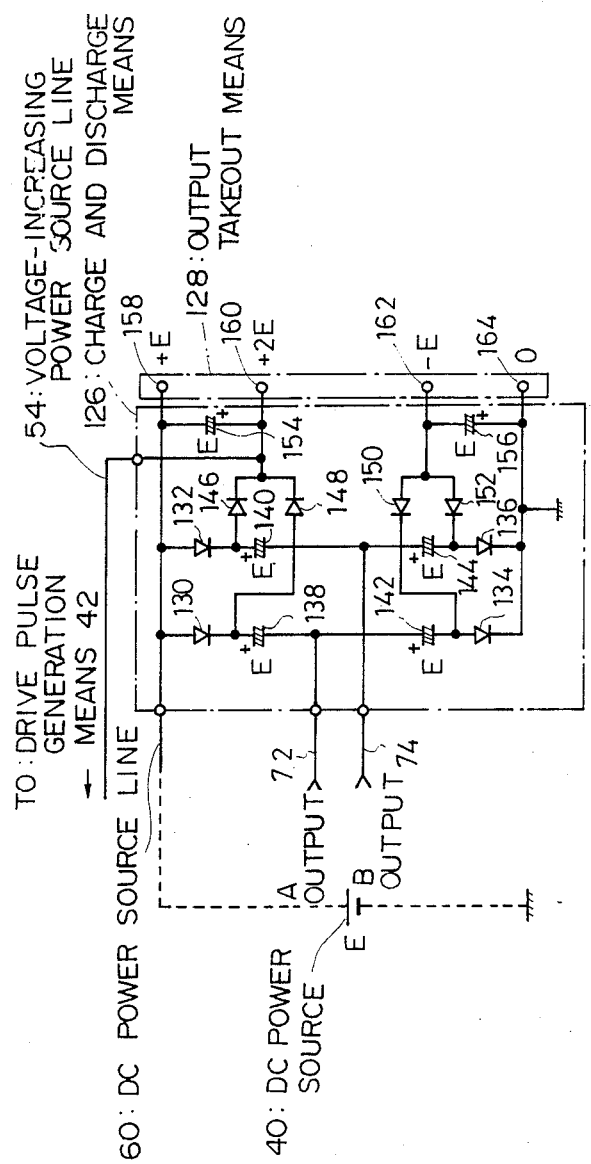

DC-TO-DC VOLTAGE-INCREASING POWER SOURCE

BACKGROUND OF THE INVENTION

This invention relates to a DC-to-DC voltage increasing power source of a pumping capacitor system and, more particularly, to such power source capable of preventing occurrence of unnecessary radiation due to abrupt flowing of a large current from a DC power source.

It sometimes becomes necessary in an audio device mounted on an automobile or a portable type audio device to obtain a DC voltage which is higher than a DC voltage produced by a battery or dry cell.

For converting a DC voltage from the power source to a higher DC voltage, there have been known a device using a BTL circuit, one using a DC-to-DC converter or a switching regulator and one using pumping capacitors.

The BTL circuit can produce, theoretically, an output voltage which is twice as large as the power source voltage (output power is four times as large as the power from the power source). Since, however, a load current flows in two amplifiers in this circuit, power loss in the amplifiers becomes double with resulting drop in efficiency. Besides, an output voltage larger than this double voltage cannot be obtained by this circuit.

A DC-to-DC converter and a switching regulator once switch a DC power source voltage with a high frequency and converts the voltage by a transformer and then restores the converted voltage to a DC voltage. In these devices, it is easy to obtain an output voltage which is larger than a voltage twice as large as the power source voltage, but their efficiency is poor because their transformer has copper loss and iron loss. Besides, since the transformer is relatively large and heavy, the device employing the transformer becomes bulky and heavy. There has been an attempt to overcome this disadvantage by increasing the switching frequency and thereby reducing the size of the transformer but, although the transformer becomes smaller, it becomes expensive because it requires a core with a small loss. Moreover, if the switching frequency increases, a switching element having a higher switching speed corresponding to the higher frequency must be employed and this results in increase in the cost of the switching element and necessity for a more complicated circuit design.

According to the device using the pumping capacitor system, a rectifying element such as a diode or a transistor is combined with a capacitor and a DC voltage from a power source is charged in the capacitor through the rectifying element and the capacitor is serially connected to the DC power source by switching or the like means to obtain a DC voltage which is higher than the DC power source voltage. According to the pumping capacitor system, a transformer is unnecessary so that the device can be made small and light and its manufacturing cost is reduced. Moreover, a capacitor is higher in efficiency than a transformer because the capacitor is much smaller in equivalent serial resistance than the transformer which has copper loss and iron loss. The pumping capacitor system therefore is advantageous in that a DC-to-DC voltage-increasing device can be constructed easily and cheaply.

FIG. 2 shows a prior art pumping capacitor type voltage-increasing power source. This circuit comprises charge and discharge means 12 and switching means 10. The switching means 10 comprises complementary push-pull transistors 14, 15 and complementary push-pull transistors 16, 17 connected respectively to a DC power source 11 (voltage value being E). The complementary transistors 14, 15 and 16, 17 are respectively driven by drive signals A and $\overline{A}$ which are in 180 degree phase relationship whereby the potentials at output lines 18 and 20 and switched alternately between E and ground.

The charge and discharge means 12 is made of combination of capacitors 21 through 26 and diodes 27 through 32. While voltage 0 is applied to an input terminal 33 and voltage E to an input terminal 34, the capacitor 21 is charged to voltage E through the diode 27 whereas the capacitor 23 is charged to voltage E through the diode 30. While voltage E is applied to the input terminal 33 and voltage 0 to the input terminal 34, sum voltage 2E of the power source voltage E and the voltage E of the capacitor 21 is applied to the capacitor 22 through the diode 28 so that this capacitor 21 is charged to 2E. Sum voltage 2E of the power source voltage E and the voltage E of the capacitor 23 is applied to the capacitor 24 through the diode 31 to charge this capacitor 24 to 2E.

While voltage 0 is applied to the input terminal 33 and voltage E to the input terminal 34, sum voltage 3E of the power source voltage E and the voltage 2E of the capacitor 22 is applied to the capacitor 25 through the diode 29 to charge this capacitor 25 to 3E and this voltage 3E is provided at an output terminal 35.

During the same period, voltage 2E of the capacitor 24 is applied to the capacitor 26 through the diode 32 to charge this capacitor 26 to 2E and its terminal voltage −2E is provided at an output terminal 36.

The circuit of FIG. 2 is so designed that the on-off operation is performed with the transistors 14, 15 and 16, 17 being in a completely saturated state and, accordingly, inrush current for charging the capacitors 21 through 26 is generated in a period immediately after turning-on of the power source and during sharp increase in the load current with a result that a pluse-like electromagnetic radiation is produced which causes a high frequency noise, i.e., noise due to unnecessary radiation.

Further, in the circuit of FIG. 2, there tends to be produced a period of time, though it is only of a short duration, during which both the transistors 14 and 16, or both the transistors 16 and 17 are turned on due to accumulated charge in a transient period between the on state and off state of the transistors 14, 15 or the transistors 16, 17 with a resulting flow of a longitudinal current. This longitudinal current is a kind of inrush current and causes damage to component elements and pulse-like electromagnetic radiation resulting in generation of the high frequency noise.

It is, therefore, an object of the invention to provide a DC-to-DC voltage-increasing power source capable of preventing occurrence of the inrush current in a period immediately after turning on of a power source and during sharp increase in load current, or the inrush current due to the longitudinal current and thereby reducing noise caused by unnecessary radiation.

SUMMARY OF THE INVENTION

For achieving the above described object, there is provided a DC-to-DC voltage-increasing power source comprising a DC power source, drive pulse generation means for generating drive pulses which are in 180 degree phase relationship, switching means of a push-pull construction supplied with operating voltage from said DC power source and driven between an on-state and an off-state in response to the drive pulses, charge and discharge means comprising capacitors charged by being connected in parallel to said DC power source during one operation phase of said switching means and discharging a sum voltage by being connected in series to said DC power source during the other operation phase of said switching means, and output takeout means for taking out the sum voltage discharged from said charge and discharge means as a voltage-increased DC output characterized in that said switching means is constructed of voltage-controlled type elements whose on-state is changed in response to the level of an on-pulse in the drive pulses, and said drive pulse generation means comprises pulse level changing means for changing the level of the on-pulse in the drive pulses.

According to the invention, the level of the on-pulse in the drive pulses is changed in response to the output of the output takeout means and the on-state of the switching means is changed in response to the change in the level of the on-pulse. Accordingly, in a period immediately after turning-on of the power source or during sharp increase in load current, the switching means is gradually turned to the on-state in accordance with increase in the output and, therefore, generation of the inrush current and the noise due to unnecessary radiation are avoided.

In one aspect of the invention, there is provided a DC-to-DC voltage-increasing power source comprising a DC power source, drive pulse generation means for generating drive pulses which are in 180 degree phase relationship, switching means of a push-pull construction supplied with operating voltage from said DC power source and driven between an on-state and an off-state in response to the drive pulses, charge and discharge means comprising capacitors charged by being connected in parallel to said DC power source during one operation phase of said switching means and discharging a sum voltage by being connected in series to said DC power source during the other operation phase of said switching means, and output takeout means for taking out the sum voltage discharged from said charge and discharge means as a voltage-increased DC output characterized in that said switching means comprises variable time constant means provided on the input side thereof for transmitting an on-pulse in the drive pulses with a relatively large time constant and an off-pulse in the drive pulses with a relatively small time constant.

According to this feature of the invention, since the off-pulse has a larger time constant than the on-pulse, simultaneous turning-on of the switching means which is of a push-pull construction is avoided whereby generation of unnecessary radiation noise due to inrush current is avoided.

Preferred embodiments of the invention will now be described with reference to the accompanying drawings.

BRIEF DESCRIPTION OF THE DRAWINGS

In the accompanying drawings,

FIGS. 6 through 9 are circuit diagrams showing modified examples of the charge and discharge means.

DESCRIPTION OF PREFERRED EMBODIMENTS

Figure 1:
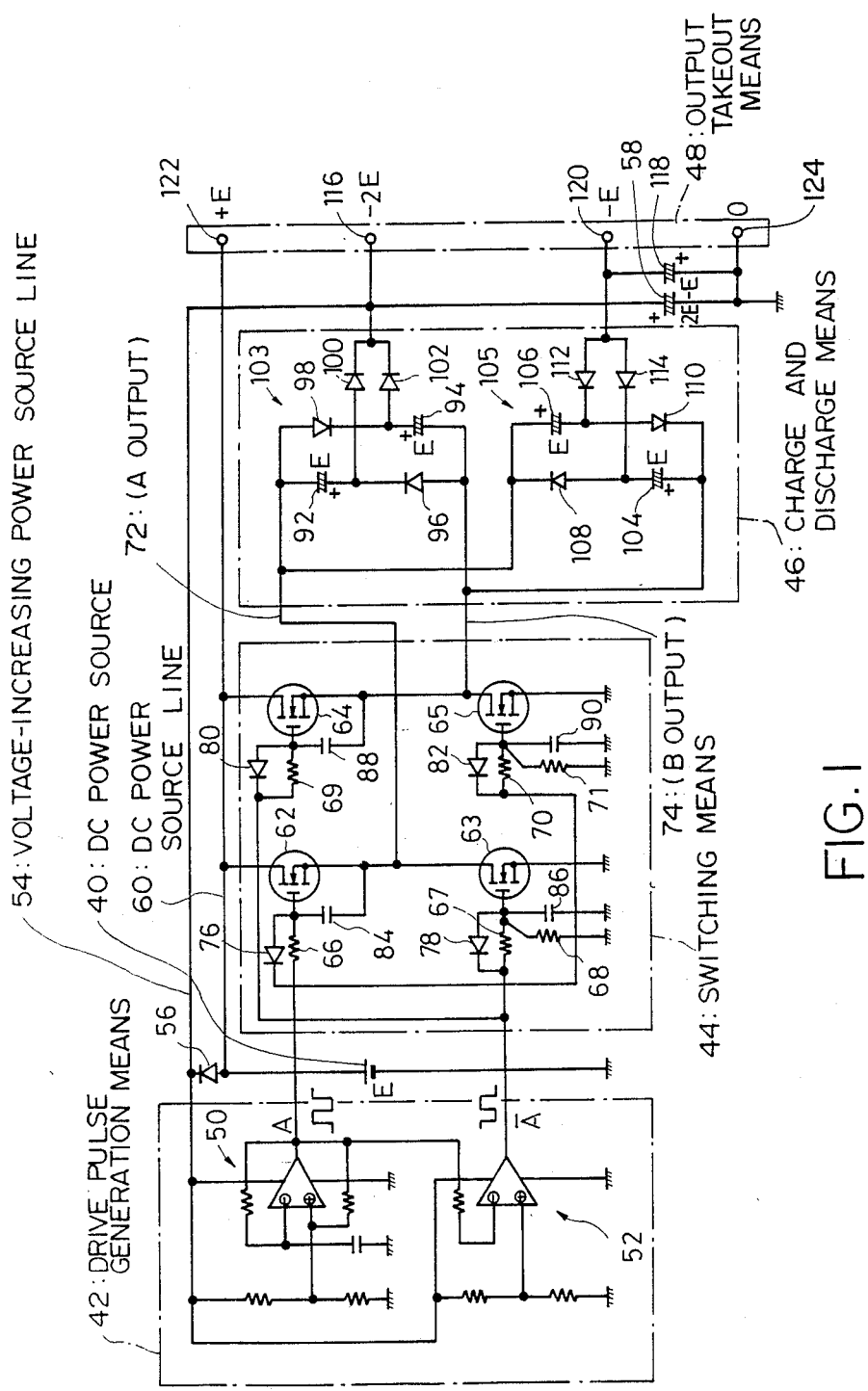
FIG. 1 is a circuit diagram showing an embodiment of the invention.
Figure 2:
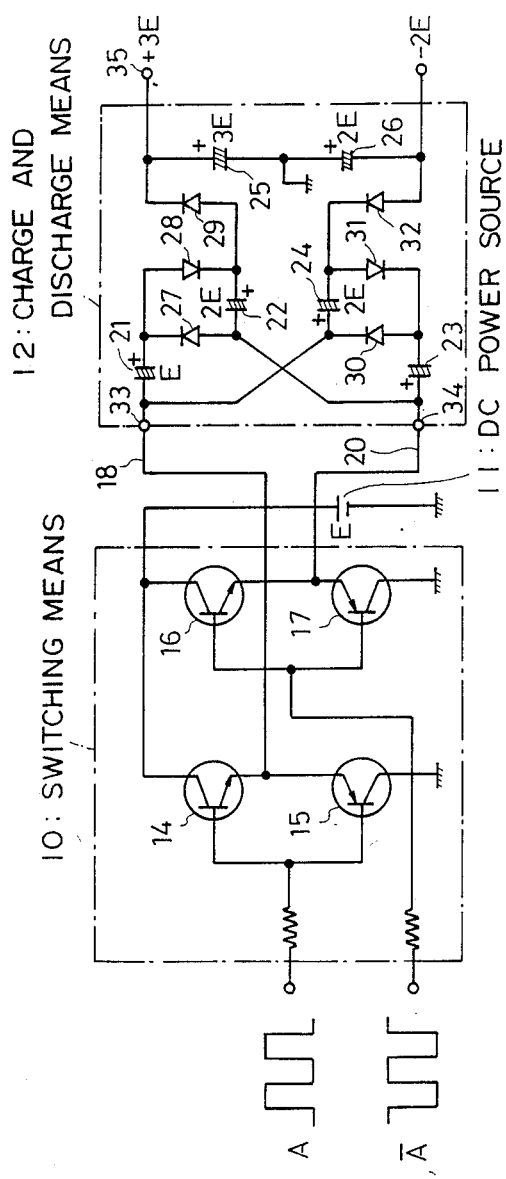
FIG. 2 is a circuit diagram showing a prior art voltage-increasing power source.

An embodiment of the invention is shown in FIG. 1. This voltage-increasing power source comprises a DC power source 40, drive pulse generation means 42, switching means 44, charge and discharge means 46 and output takeout means 48.

The DC power source 40 constitutes the power source of this circuit and its power source voltage is E[V]. The drive pulse generation means 42 comprises a square wave oscillator 50 generating a square wave signal A of a predetermined period and an inversion circuit 52 generating an inverted signal $\bar{A}$ of this square wave signal A. The drive pulse generation means 42 outputs these square waves A and $\bar{A}$ as drive pulses.

The drive pulse generation means 42 is constructed of a couple of multivibrator circuits having oscillation outputs of about 100 Hz to about 500 Hz which are in 180 degree phase relationship. Electric power is supplied to this drive pulse generation means 42 through a voltage-increasing power source line 54. A diode 56 is connected between the DC power source 40 and the voltage-increasing power source line 54. When voltage of an output capacitor 58 is lower than voltage E in a period immediately after turning-on of the DC power source 40, voltage is supplied from the DC power source 40 to the drive pulse generation means 42 through the diode 56. When the voltage of the output capacitor 58 has become higher than the voltage E thereafter, the diode 56 is turned off and the voltage of the output capacitor 58 is supplied to the drive pulse generation means 42 through the voltage-increasing power source line 56. The drive pulses A and A are substantially equal in their high level to the power source voltage supplied and substantially equal in their low level to the ground level.

The switching means 44 comprises a circuit including serially connected N-channel MOS-FETs 62, 63 and a circuit including a serially connected N-channel MOS-FETs 64, 65 respectively between a DC power source line 60 and the ground. Output lines 72 and 74 are connected respectively to the connecting point of the FETs 62 and 63 and the connecting point of the FETs 64 and 65. To the gate of the FET 62 is supplied the drive pulse A through resistance 66. To the gate of the FET 63 is supplied a signal obtained by voltage-dividing the drive pulse $\bar{A}$ with resistance 67 and 68. To the gate of the FET 64 is supplied the drive pulse $\bar{A}$ through resistance 69. To the gate of the FET 65 is supplied a signal obtained by voltage-dividing the drive signal A with resistances 70 and 71. By this arrangement, the FETs 62, 63 and the FETs 64, 65 are push-pull driven in 180 degree phase relationship with each other thereby connecting the output lines 72 and 74 alternately to the DC power source line 60 and to the ground.

Figure 3:
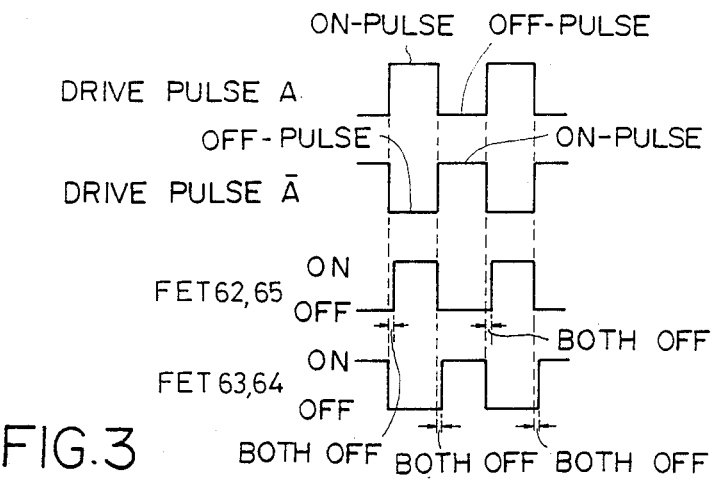
FIG. 3 is a time chart showing a delay operation of start of turning-on of FETs 62 through 65 by the operation of diodes 76, 78, 80 and 82 in FIG. 1.

In the switching means 44, diodes 76, 78, 80 and 82 connected in parallel to the resistances 66, 67, 69 and 70 and capacitors 84, 86, 88 and 90 connected between the gate and source of the respective FETs 62, 63, 64 and 65 constitute variable time constant means for transmitting an on-pulse in the drive pulses A and $\overline{A}$ through a relatively large time constant and an off-pulse with a relatively small time constant. More specifically, when, as shown in FIG. 3, the drive pulses A and $\overline{A}$ are on-pulses (i.e., high level), the capacitors 84, 86, 88 and 90 are charged through the resistances 66, 67, 69 and 70 so that the FETs 62, 63, 64 and 65 are turned on with a slight delay whereas when the drive pulses A and $\overline{A}$ are off-pulses (i.e., low level), electric charges of the capacitors 84, 86, 88 and 90 are discharged instantaneously through the diodes 76, 78, 80 and 82 so that the FETs 62, 63, 64 and 65 are turned off instantly. Accordingly, simultaneous turning-on of the FETs 62 and 63 or FETs 64 and 65 is avoided so that flowing of longitudinal current is prevented.

The employment of power MOS-FETs as the switching means 44 contributes to prevention of heat loss due to saturated collector-emitter voltage Vces which would occur if transistors were used and, moreover, a large power output can be delivered out with a small power control. Besides, since the switching means 44 is a push-pull construction using N-channel MOS-FETs, P-channel power MOS-FETs which are currently inferior in efficiencies to the N-channel power MOS-FETs need not be used, selection of pairs can be made easily and switching-on resistance can be adequately reduced.

The charge and discharge means 46 comprises a circuit 103 including a combination of capacitors 92 and 94 and diodes 96, 98, 100 and 102 for obtaining an output of 2E and a circuit 105 including a combination of capacitors 104 and 106 and diodes 108, 110, 112 and 114 for obtaining an output voltage of -E. These two circuits 103 and 105 are connected to the output lines 72 and 74 of the switching means 44 (output of the output line 72 will be referred to as "B output" and output of the output line 74 as "A output" below).

In the circuit 103, when the FETs 62 and 65 are on and the FETs 63 and 64 are off, the A output is E and the B output is ground level so that the capacitor 94 is charged to E through the diode 98. When the FETs 63 and 64 are on and the FETs 62 and 65 are off, the A output is ground level and the B output is E so that the capacitor 92 is charged through the diode 96.

During charging of the capacitor 94, a sum voltage 2E of the DC power source voltage E and the voltage E of the capacitor 92 is produced through the diode 100. During charging of the capacitor 92, a sum voltage 2E of the DC power source voltage E and the voltage E of the capacitor 94 is produced through the diode 102. This voltage 2E is provided at an output terminal 116 of the output takeout means 48.

In the circuit 105, when the FETs 62 and 65 are on and the FETs 63 and 64 are off, the A output is E and the B output is ground level so that current flows through the diode 110 and the capacitor 106 is charged. When the FETs 63 and 64 are on and the FETs 62 and 65 are off, the A output is E and the B output is ground level so that current flows through the diode 108 and the capacitor 104 is charged to E.

During charging of the capacitor 106, the voltage E of the capacitor 104 is supplied to the capacitor 118 through the diode 114. During charging of the capacitor 104, the voltage E of the capacitor 106 is supplied to the capacitor 118 through the diode 112. The capacitor 118 therefore is charged to voltage E and its terminal voltage E is provided at an output terminal 120 of the output takeout means 48.

From the output takeout means 48 are provided, in addition to the above described outputs, voltage E at an output terminal 122 connected directly to the power source 40 and voltage 0 at an output terminal 124 connected to the ground.

Figure 5:
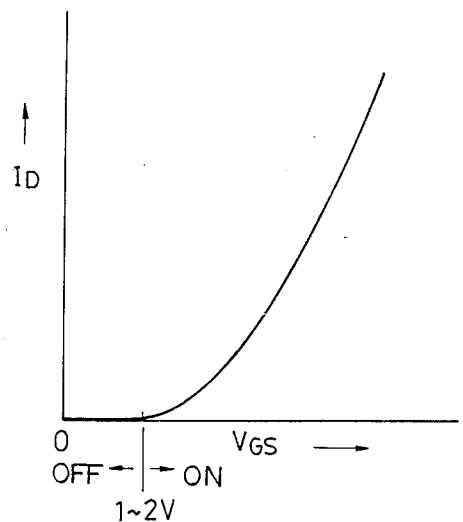
FIG. 5 is a graph showing mutual conductance characteristics of an N-channel MOS-FET.
Figure 4:
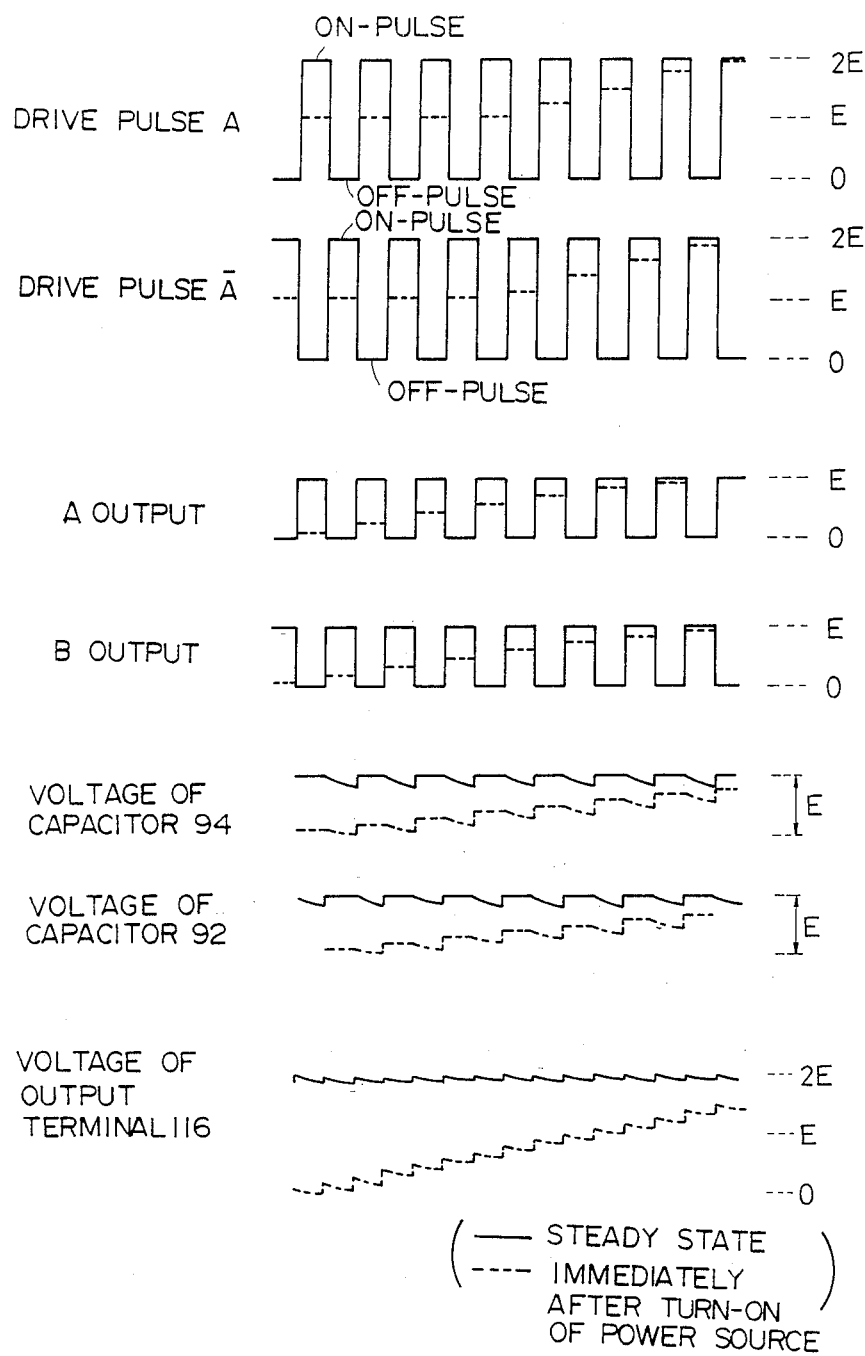
FIG. 4 is a waveform diagram showing operation of the circuit of FIG. 1.

The operation of the circuit of FIG. 1 will now be described with reference to FIG. 4. The solid line illustrates operation of the circuit in the steady state and the dotted line illustrates operation of the circuit immediately after the power source has been turned on. Since the drive pulse generation means 42 is driven by the DC power source voltage E immediately after the power source has been turned on, the level of on-pulses of the drive pulses A and $\overline{A}$ becomes E. Characteristic of mutual conductance gm of the MOS-FET becomes as shown in FIG. 5 so that the MOS-FET is not turned on unless its gate-source voltage exceeds 1 to 2 [V]. Accordingly, when the level of the on-pulses of the drive pulses A and $\overline{A}$ is E, the FETs 62 and 64 cannot be turned on completely though the FETs 63 and 65 are turned on completely. The capacitors 92, 94, 104 and 106 of the charge and discharge means 46 therefore are gradually charged during this period of time. As the capacitors 92, 94, 104 and 106 are charged, the voltage of the output capacitor 58 increases gradually from E and, accordingly, the level of the on-pulses of the output drive pulses A, $\overline{A}$ of the drive pulse generation means 42 depending for its power source upon the voltage from the output capacitor 58 also increases gradually from E resulting in gradual decrease in resistance to the turning-on of the FETs 62 and 64. In this manner, the switching means 44 is gradually turned on in the period immediately after turning-on of the power source so that occurrence of inrush current to the charge and discharge means 46 is prevented. The same is the case with a period of time during which instantaneous load increases.

The specific construction of the charge and discharge means is not limited to that shown in FIG. 1 but various other designs such as the following examples may be employed.

(1) Charge and discharge means 126 of FIG. 6

In this charge and discharge means 126, voltage E is supplied from the DC power source 40 on the DC power source line 60 and the A output and B output of the switching means 44 of FIG. 1 are supplied on the lines 72 and 74.

When the A output is E and the B output is 0, a capacitor 140 is charged to E through a diode 132 and a capacitor 142 is charged to E through a diode 134. When the A output is 0 and the B output is E, a capacitor 138 is charged to E through a diode 130 and a capacitor 144 is charged to E through a diode 136. When the A output is E and the B output is 0, a sum voltage 2E of the voltage E of the A output and the voltage E of the capacitor 138 is provided through a diode 148. When the A output is 0 and the B output is E, a sum voltage 2E of the voltage E of the B output and the voltage E of the capacitor 140 is provided through a diode 146. These sum voltages 2E charge an output capacitor 154 connected between the DC power source line 60 and these diodes 146, 148 to E so that voltages E and 2E are respectively obtained from output terminals 158 and 160 of output takeout means 128.

When the A output is 0, voltage E of the capacitor 142 is provided through a diode 150 whereas when the B output is 0, voltage E of the capacitor 144 is provided through a diode 152. An output capacitor 156 is thereby charged to −E so that voltages −E and 0 are obtained from output terminals 162 and 164 of the output takeout means 128.

By supplying voltage derived from the output terminal 160 to the drive pulse generation means 42, the switching means 44 can be gradually turned on in the period immediately after turning-on of the power source in the same manner as in the embodiment of FIG. 1 whereby occurrence of inrush current can be prevented.

Figure 7:
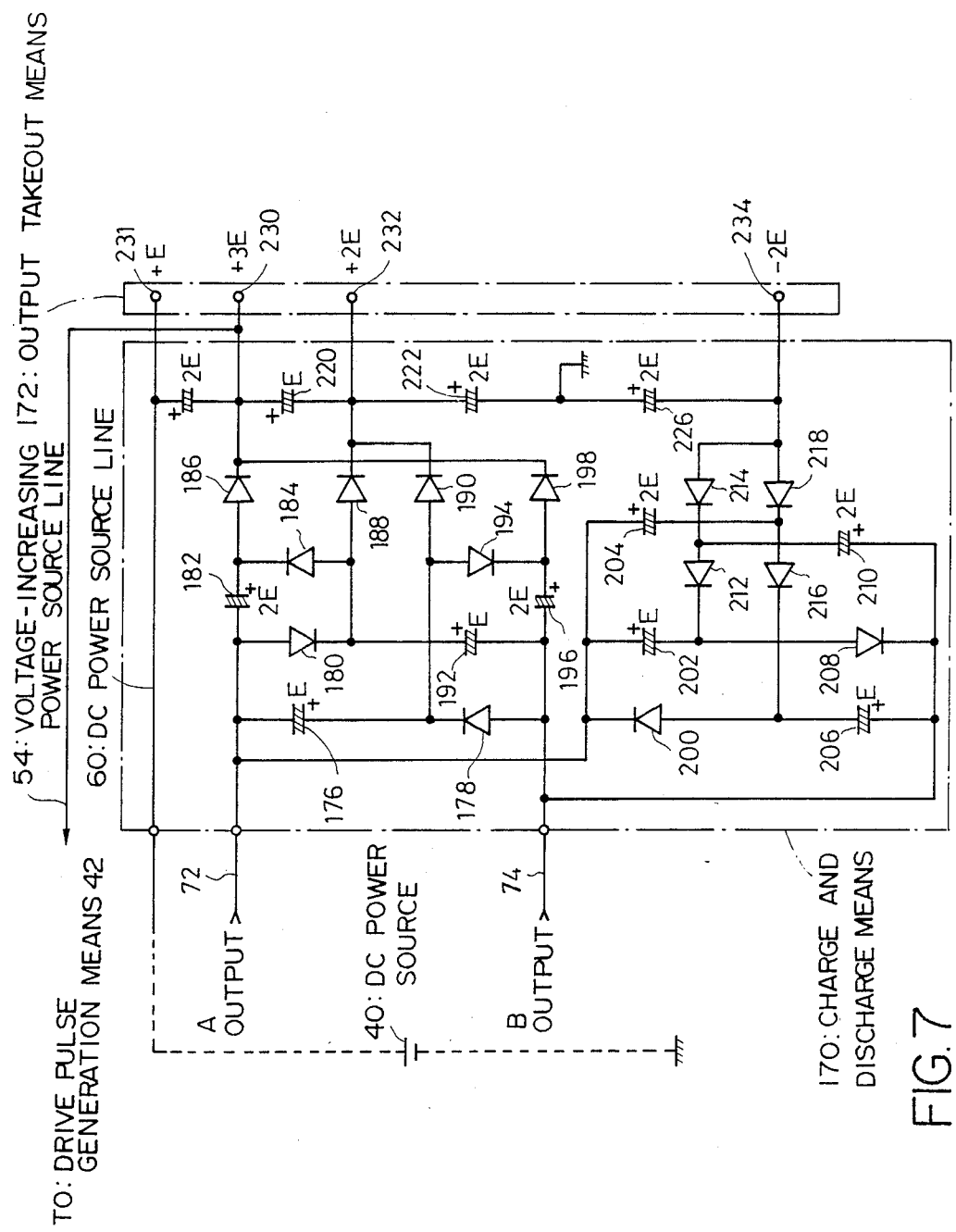

(2) Charge and discharge means 170 of FIG. 7

In the charge and discharge means 170, voltage E is supplied from the DC power source 40 to the power source line 60 and the A output and B output of the switching means 44 of FIG. 1 are respectively supplied on the lines 72 and 74.

When the A output is E and the B output is 0, a capacitor 192 is charged to E through a diode 180. When the A output is 0 and the B output is E, a capacitor 176 is charged to E through a diode 178.

When the A output is E, a sum voltage 2E of this voltage E and the voltage E of the capacitor 176 is provided through a diode 190 whereas when the B output is E, a sum voltage 2E of this voltage E and the voltage E of the capacitor 192 is provided through a diode 188. A capacitor 222 is thereby charged to 2E so that an output voltage 2E is obtained from an output terminal 232 of output takeout means 172.

When the A output is E, a sum voltage 2E of this voltage E and the voltage E of a capacitor 176 is applied to a capacitor 196 through a diode 194 to charge this capacitor 196 to 2E. When the B output is E, a sum voltage 2E of this voltage E and the voltage E of a capacitor 192 is applied to a capacitor 182 through a diode 184 to charge this capacitor 182 to 2E. When the A output is E, a sum voltage 3E of this voltage E and the voltage 2E of the capacitor 182 is provided through a diode 186 whereas when the B output is E, a sum voltage 3E of this voltage E and the voltage 2E of the capacitor 196 is provided through a diode 198 whereby a capacitor 220 is charged to E and an output voltage 3E is provided from an output terminal 230.

When the A output is E, a capacitor 202 is charged to E through a diode 208 whereas when the B output is E, a capacitor 206 is charged to E through a diode 200. When the A output is E, a sum voltage 2E of this voltage E and the voltage E of the capacitor 206 is applied to a capacitor 204 through a diode 216 to charge this capacitor 204 to 2E. When the output B is E, a sum voltage 2E of this voltage E and the voltage E of the capacitor 202 is applied to a capacitor 210 through a diode 212 to charge this capacitor 210 to 2E. When the output A is 0, the voltage 2E of the capacitor 204 is provided through a diode 218 whereas when the B output is 0, the voltage 2E of the capacitor 210 is provided through a diode 214 whereby a capacitor 226 is charged to 2E and an output voltage −2E is obtained from an output terminal 234.

In addition to the above described outputs, voltage E is obtained from an output terminal 231 connected directly to the DC power source 40 in the output takeout means 172.

By supplying voltage 3E from the output terminal 230 to the drive pulse circuit 172 through the voltage-increasing power source line 54, the switching means 44 can be gradually turned on in the period immediately after turning-on of the power source in the same manner as in the embodiment of FIG. 1 whereby occurrence of inrush current can be prevented.

Figure 8:
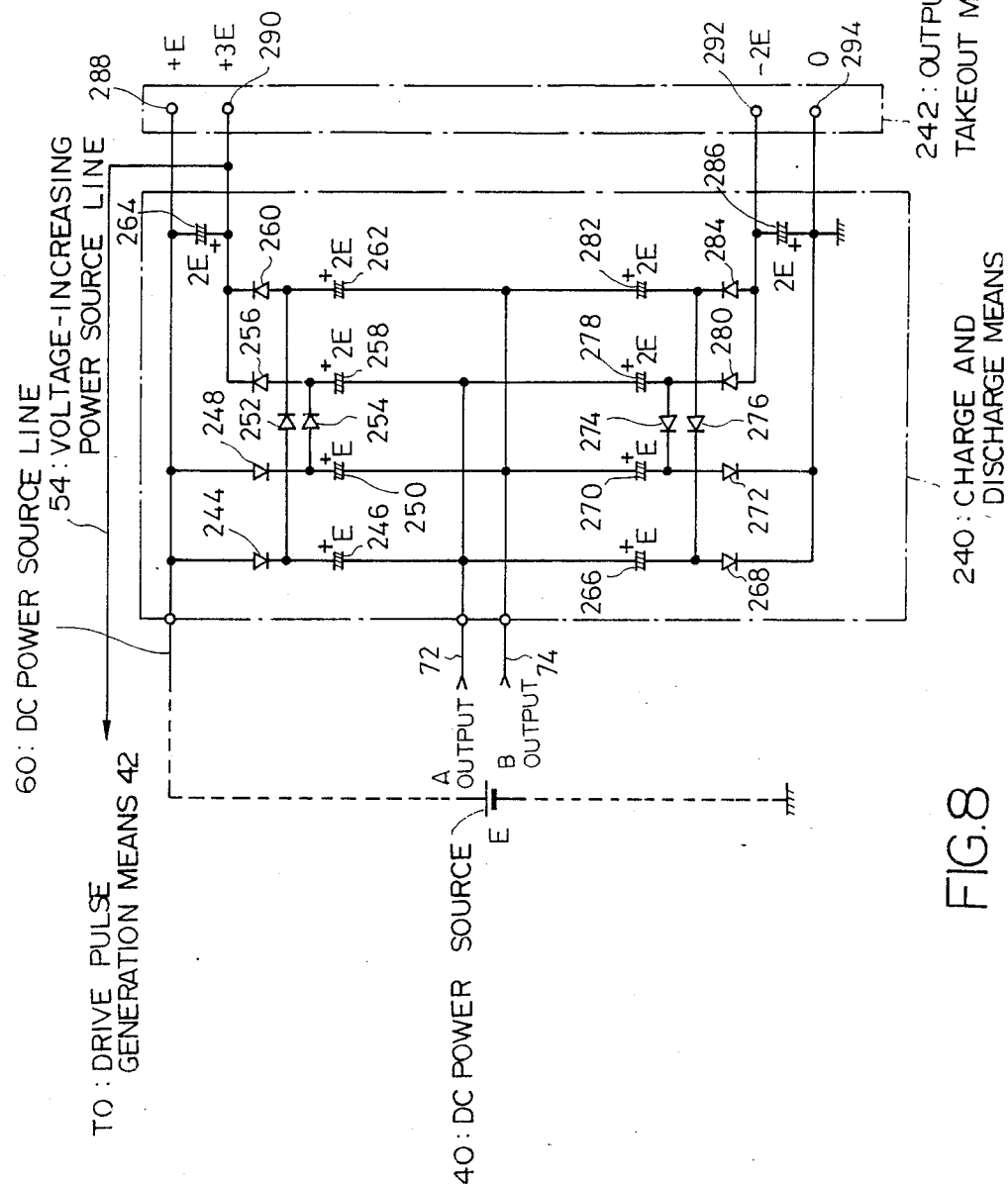

(3) Charge and discharge means 240 of FIG. 8

In the charge and discharge means 240, voltage E from the DC power source 40 is supplied on the power source line 60 and the A output and B output of the switching means 44 of FIG. 1 are supplied on the lines 72 and 74.

When the A output is 0, a capacitor 246 is charged to E through a diode 244 whereas when the B output is 0, a capacitor 250 is charged to E through a diode 248.

When the A output is E, a sum voltage 2E of this voltage E and the voltage E of the capacitor 246 is applied to a capacitor 262 through a diode 252 to charge this capacitor 262. When the output B is E, a sum voltage 2E of this voltage E and the voltage E of the capacitor 250 is applied to a capacitor 258 through a diode 254 to charge this capacitor 258 to 2E.

When the A output is E, a sum voltage 3E of this voltage E and the voltage 2E of the capacitor 258 is provided through a diode 256 whereas when the output B is E, a sum voltage 3E of this voltage E and the voltage 2E of the capacitor 262 is provided through a diode 260 to charge this capacitor 264 to 2E. An output voltage 3E therefore is obtained from an output terminal 290 of output takeout means 242.

When the A output is E, a capacitor 266 is charged to E through a diode 268 whereas when the B output is E, a capacitor 270 is charged to E through a diode 272. When the A output is E, a sum voltage 2E of this voltage E and the voltage E of the capacitor 270 is applied to a capacitor 278 through a diode 274 to charge this capacitor 278 to 2E. When the B output is E, a sum voltage 2E of this voltage E and the voltage E of the capacitor 266 is applied to a capacitor 282 through a diode 272 to charge this capacitor 282 to 2E. When the A output is 0, the voltage 2E of the capacitor 278 is provided through a diode 280 whereas when the B output is 0, the voltage 2E of the capacitor 282 is provided through a diode 284 to charge a capacitor 286 to 2E. An output voltage −2E is obtained from an output terminal 292.

From output takeout means 242, in addition to these outputs, an output voltage E is obtained from an output terminal 288 connected to the DC power source 40 and an output voltage 0 is obtained from an output terminal 294 connected directly to the ground.

By supplying the voltage 3E of the output terminal 290 to the drive pulse circuit 172 through the voltage-increasing power source line 54, the switching means 44 can be gradually turned on in the period immediately after turning-on of the power source in the same manner as in the embodiment of FIG. 1 whereby occurrence of inrush current can be prevented.

Figure 9:
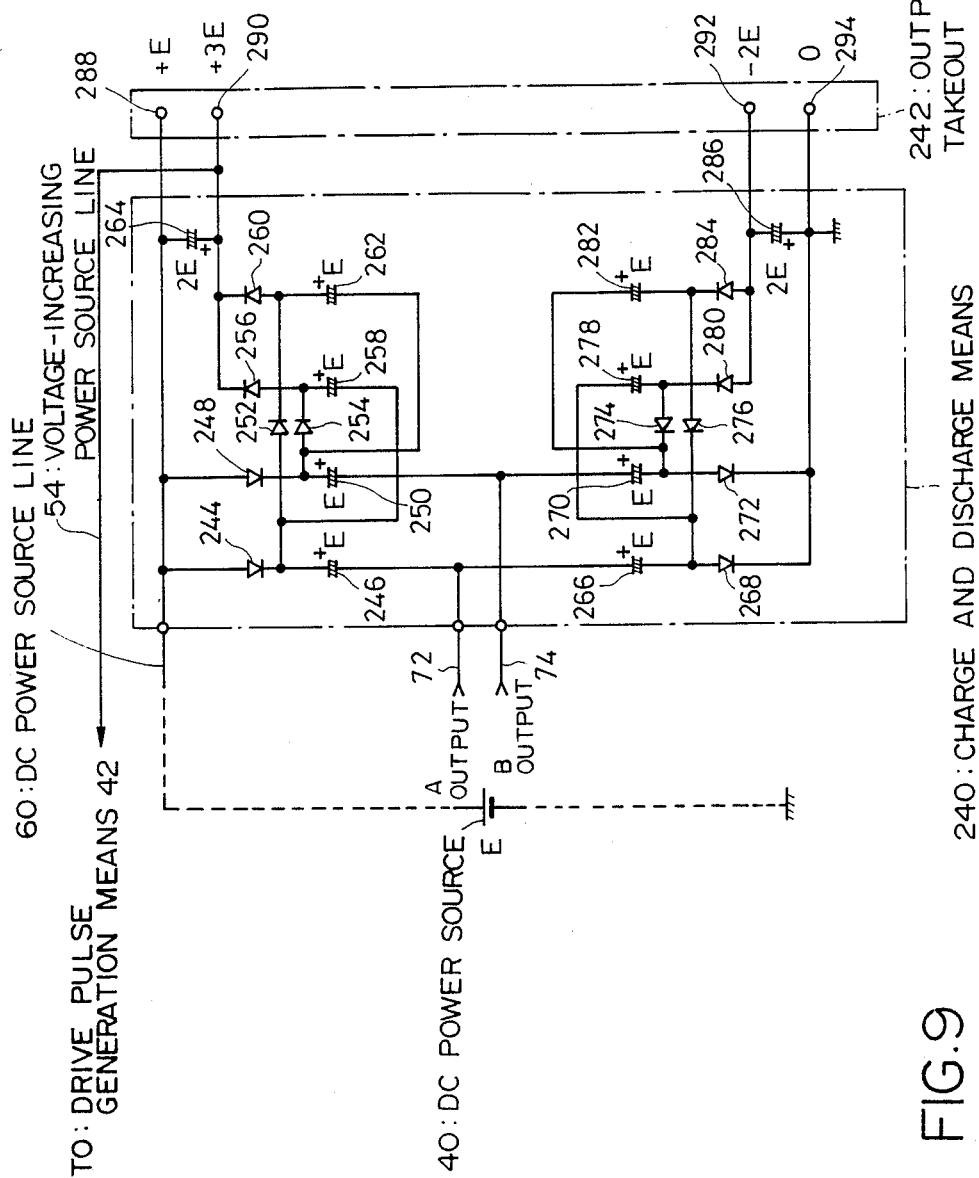

(4) Charge and discharge means 240' of FIG. 9

The charge and discharge means 240' of FIG. 9 is an example in which the wiring of the charge and discharge means 240 of FIG. 8 is modified. In this example, the lower terminal as viewed in the FIG. of a capacitor 258 is connected between a diode 244 and a capacitor 246 and the lower terminal as viewed in the FIG. of a capacitor 262 is connected between a diode 248 and a capacitor 250. The upper terminal as viewed in the FIG. of a capacitor 278 is connected between a capacitor 266 and a diode 268 and the upper terminal of a capacitor 282 is connected between a capacitor 270 and a diode 272.

According to this arrangement, the capacitors 246, 250, 266 and 270 are charged to E through the same charging path as in the example of FIG. 8 but the discharging path of these capacitors is different from the example of FIG. 8. More specifically, when the A output is E, a sum voltage 2E of this voltage E and the voltage E of the capacitor 246 is applied to the upper terminal of the capacitor 262 through a diode 252 and the voltage E of the upper terminal of the capacitor 250 is applied to the lower terminal of the capacitor 262 so that the capacitor 262 is charged to E. When the B output is E, a sum voltage 2E of this voltage E and the voltage E of the capacitor 250 is applied to the upper terminal of the capacitor 258 through the diode 254 and the voltage E of the upper terminal of the capacitor 246 is applied to the lower terminal of the capacitor 258 whereby the capacitor 258 is charged to E. When the A output is E, a sum voltage 3E of this voltage E, the voltage E of the capacitor 246 and the voltage E of the capacitor 258 is provided through a diode 256 whereas when the B output is E, a sum voltage 3E of this voltage E, the voltage E of the capacitor 250 and the voltage E of the capacitor 262 is provided through a diode 260 whereby an output voltage 3E is obtained from an output terminal 290.

When the A output is E and the B output is 0, voltage 0 of the lower terminal of a capacitor 266 is applied to the upper terminal of a capacitor 278 and the voltage −E of the capacitor 270 is applied to the lower terminal of the capacitor 278 through a diode 274 to charge the capacitor 278 to E. When the A output is 0 and the B output is E, voltage 0 of the lower terminal of the capacitor 270 is applied to the upper terminal of a capacitor 282 and voltage −E of the lower terminal of the capacitor 266 is applied to the lower terminal of the capacitor 282 through a diode 276 to charge the capacitor 282 to E. When the A output is 0, a sum voltage 2E of the voltage E of the capacitor 266 and the voltage E of the capacitor 278 is provided through a diode 280 whereas when the B output is 0, a sum voltage 2E of the voltage E of the capacitor 270 and the voltage E of the capacitor 282 is provided through a diode 284 whereby an output voltage −2E is obtained from an output terminal 292.

In the circuit of FIG. 8, the capacitors 258, 262, 278 and 282 are charged to 2E but in the circuit of FIG. 9, these capacitors are charged to only E so that capacitors of a lower voltage withstanding ability and therefore of a more compact size can be used as these capacitors.

In the embodiment of FIG. 1, the period of the drive pulses A, $\overline{A}$ is constant. The period may however be variable. If, for example, the period immediately after turning-on of the power source is made longer, power supply ability of the power source can be increased.

Figure 10:
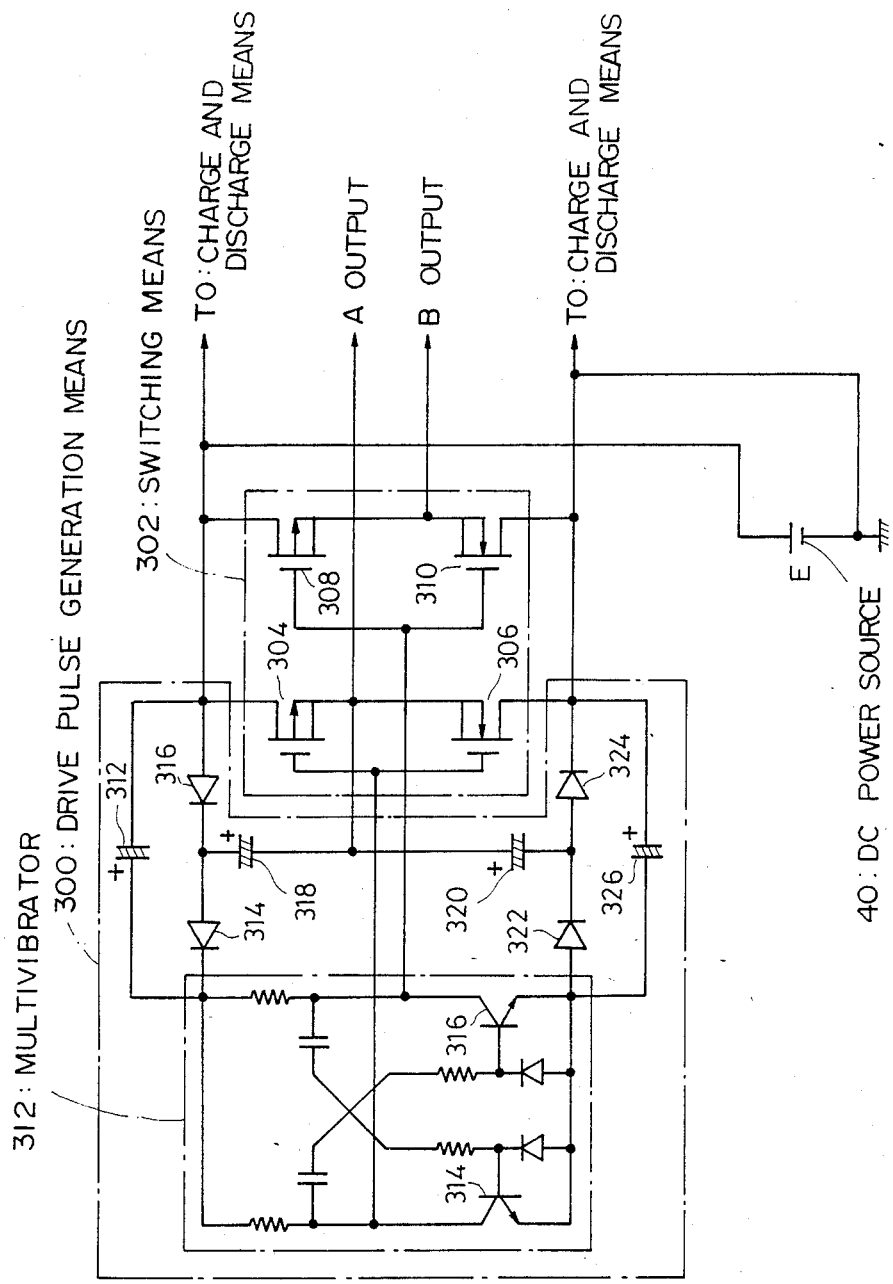
FIG. 10 is a circuit diagram showing a modified example of the drive pulse generation means.

An example of the drive pulse generation means in which the period immediately after turning-on of the power source is made longer is shown in FIG. 10. In this example, switching means 302 is constructed of FETs 304, 306 and FETs 308, 310 respectively connected in complementary push-pull connection.

Drive pulse generation means 300 comprises a multivibrator 332. When a transistor 314 of the multivibrator 332 is on and a transistor 316 is off, the FETs 304 and 310 are on and the FETs 306 and 308 are off so that the A output is E and the B output is 0. At this time, current flows from the DC power source 40 to the ground through the FET 304, a capacitor 320 and a diode 324 thereby charging the capacitor 320. When the transistor 314 is off and the transistor 316 is on, the FETs 306 and 308 are on and the FETs 304 and 310 are off so that the A output is 0 and the B output is E. At this time, current flows from the DC power source 40 to the ground through a diode 316, a capacitor 318 and the FET 306 thereby charging the capacitor 318.

When the FET 304 is turned on, a sum voltage of the DC power source voltage E and the voltage of the capacitor 318 is applied to a capacitor 312 through a diode 314 to charge this capacitor 312 to the value of this sum voltage. When the FET 306 is turned on, the voltage of a capacitor 320 is applied to a capacitor 326 through a diode 322 to charge this capacitor 326 to the same voltage.

To the multivibrator 332 is supplied, as power source, a voltage between potential at the left terminal as viewed in the FIG. of the capacitor 312 (DC power source voltage E+voltage of the capacitor 312) and potential of the left terminal as viewed in the FIG. of the capacitor 326 (ground level+voltage of the capacitor 326). Since the capacitors 312 and 326 have not been charged yet immediately after turning-on of the power source, the multivibrator 332 is driven by the voltage E and the drive pulses A, $\overline{A}$ are produced with a relatively long period to switch the switching means 302. Thereafter, as the capacitors 312 and 326 are gradually charged, the voltage driving the multivibrator 332 increases and the period of the drive pulses A, $\overline{A}$ becomes gradually shorter. Finally, the capacitor 312 is charged to 2E and the capacitor 326 is charged to −E so that the multivibrator 332 is driven by voltage 3E.

In the above described embodiments, the switching means is constructed of FETs. The invention however is applicable to a case where the switching means is constructed of bipolar type transistors.

What is claimed is:

1. A DC-to-DC voltage-increasing power source comprising:
    a DC power source;
    drive pulse generation means for generating drive pulses which are in 180 degree phase relationship;
    switching means of a push-pull construction supplied with operating voltage from said DC power source and driven between an on-state and an off-state in response to the drive pulses;
    charge and discharge means comprising capacitors charged by being connected in parallel to said DC power source during one operation phase of said switching means and discharging a sum voltage of voltage of said DC power source and voltage of the charged capacitors by being connected in series to said DC power source during the other operation phase of said switching means; and
    output takeout means for taking out the sum voltage discharged from said charge and discharge means as a voltage-increased DC output, said switching means being constructed of voltage-controlled type elements whose on-state is changed in response to the level of an on-pulse in the drive pulses, and said drive pulse generation means comprising pulse level changing means for changing the level of the on-pulse in the drive pulses.

2. A DC-to-DC voltage-increasing power source as defined in claim 1 wherein said drive pulse generation means comprises a couple of multivibrator circuits.

3. A DC-to-DC voltage-increasing power source as defined in claim 1 wherein the drive pulses generated by said pulse generation means have a pulse period which is longer immediately after turning-on of said DC power source than during normal time.

4. A DC-to-DC voltage-increasing power source as defined in claim 1 wherein said switching means comprises MOS-FETs.

5. A DC-to-DC voltage-increasing power source as defined in claim 1 wherein said switching means comprises bipolar transistors.

6. A DC-to-DC voltage-increasing power source comprising:
    a DC power source;
    drive pulse generation means for generating drive pulses which are in 180 degree phase relationship;
    switching means of a push-pull construction supplied with operating voltage from said DC power source and driven between an on-state and an off-state in response to the drive pulses;
    charge and discharge means comprising capacitors charged by being connected in parallel to said DC power source during one operation phase of said switching means and discharging a sum voltage of voltage of said DC power source and voltage of the charged capacitors by being connected in series to said DC power source during the other operation phase of said switching means; and
    output takeout means for taking out the sum voltage discharged from said charge and discharge means as a voltage-increased DC output,
    said switching means comprising variable time constant means provided on the input side thereof for transmitting an on-pulse in the drive pulses with a relatively large time constant and an off-pulse in the drive pulses with a relatively small time constant.

7. A DC-to-DC voltage-increasing power source as defined in claim 6 wherein said drive pulse generation means comprises a couple of multivibrator circuits.

8. A DC-to-DC voltage-increasing power source as defined in claim 6 wherein the drive pulse generated by said pulse generation means have a pulse period which is longer immediately after turning-on of said DC power source than during normal time.

9. A DC-to-DC voltage-increasing power source as defined in claim 6 wherein said switching means comprises MOS-FETs.

10. A DC-to-DC voltage-increasing power source as defined in claim 6 wherein said switching means comprises bipolar transistors.

* * * * *